United States Patent [19]

Brunnengraber

[11] 4,002,076

[45] Jan. 11, 1977

[54] METHOD AND CIRCUIT FOR USE IN DETERMINING UNBALANCE OF A ROTARY BODY

[75] Inventor: Hermann Brunnengräber, Heppenheim, Germany

[73] Assignee: Gebr. Hofmann KG, Darmstadt, Germany

[22] Filed: Apr. 26, 1976

[21] Appl. No.: 680,127

[30] Foreign Application Priority Data

Apr. 30, 1975 Germany .......................... 2519356

[52] U.S. Cl. ................................................ 73/462
[51] Int. Cl.² ........................................ G01M 1/22
[58] Field of Search ................................ 73/462

[56] References Cited

UNITED STATES PATENTS 3,091,125  5/1963  Budnick et al. .................... 73/462

FOREIGN PATENTS OR APPLICATIONS 979,013  1/1965  United Kingdom ................. 73/462

*Primary Examiner*—James J. Gill
*Attorney, Agent, or Firm*—Cushman, Darby & Cushman

[57] ABSTRACT

A method and circuit for use in determining unbalance of a rotary body having structurally predetermined compensation planes and restricted angular regions thereof in which the unbalance signals of the respective compensation planes are produced and applied to respective first and second inverting amplifiers if the compensation cannot be carried out in the compensation planes and a substitute plane is required. The outputs of the first and second amplifiers are added in a third amplifier whose output value varies as a function of the distance of the substitution plane from a compensation plane so that the output of the second amplifier, with the output of the first amplifier applied to its input, indicates the compensation in the substitution plane and the output of the third amplifier indicates the compensation in the other compensation plane.

7 Claims, 4 Drawing Figures

METHOD AND CIRCUIT FOR USE IN DETERMINING UNBALANCE OF A ROTARY BODY

The invention relates to a method of determining unbalance and a circuit arrangement for a balancing machine, for removing unbalance on rotary bodies which permit unbalance correction or compensation only in structurally predetermined compensation planes and restricted angular regions.

A balancing machine has been proposed comprising measurement value pick-ups, for example in the form of force-measuring or travel-measuring members arranged in the mounting planes, i.e., the planes in which a body to be balanced is supported in the machine. When the body is rotated in the machine for an unbalance-determining operation, the measurement value pick-ups produce alternating-current voltages which are proportional to the magnitude and the phase position of the unbalance. These alternating-current voltages are converted in a suitable conversion device to the predetermined unbalance compensation planes in which the unbalance can be corrected, for example, by adding or removing material on the body. Unbalance correction or compensation is carried out with reference to the measurement values in components or on a polar basis.

Any rotary bodies, for example crankshafts, permit unbalance to be corrected only in restricted angular regions so that any unbalance must be corrected in a number of compensation planes, the angular regions of which mutually supplement each other. For this purpose, one form of such a balancing machine comprises a device in which the unbalance values determined in the form of alternating-current voltages at the mounting planes are converted into direct-current voltages by a conversion means, and transferred by switching means which are provided between the conversion means and display or control devices and which are operable in dependence on the direction of current flow, to respective substitution planes in which the unbalance-compensating operation can actually be effected, in dependence on the structural configuration of the body. The direct-current voltages are passed to the respective substitution compensation planes if the direct-current voltages which are associated with outer compensation planes have a negative sign, which means that unbalance correction or compensation cannot be carried out in such planes.

Such a circuit arrangement is in general only designed for one type of body to be balanced and it is not readily possible to carry out the above-described conversion to the substitution planes, for example, in respect of rotary bodies whose central plane is arranged at an out-of-center position; particularly when it is desired successively to balance rotary bodies which have varying dimensions as regards the distance of a mean substitution plane from the compensation planes, difficulties may arise. This means that a high level of expenditure must be made when displacing the planes as is required for balancing different kinds of crankshaft structure.

According to the present invention, there is provided a method of determining unbalance of a rotary body which is of a structural configuration providing structurally predetermined compensation planes and restricted angular regions thereof, for compensation of such unbalance, the magnitude and angular position of an unbalance; determining whether said unbalance can be compensated in at least one said compensation plane; and if the compensation cannot be so connected, converting the unbalance value to another compensation plane and/or to a substitution plane in which such compensation can be so effected. This conversion is accomplished by the following steps: (a) applying a first electrical signal representing a said unbalance value that cannot be compensated in a given compensation plane to a first inverting amplifier; (b) applying a second electrical signal representing an unbalance value that cannot be compensated in another given compensating plane, to a second inverting amplifier; (c) adding the output of the first inverting amplifier to the output of the second inverting amplifier, by way of a third inverting amplifier whose output value is influenced in dependence on the distance of the substitution plane from the given compensation plane, the output of the first inverting amplifier also being applied to the input of the second inverting amplifier, the output of the second inverting amplifier being available for use for unbalance compensation in the substitution plane, and the result of the adding operation being available for use in unbalance compensation in the other compensation plane.

In another aspect, for a balancing machine, the invention provides a circuit arrangement for determining unbalance of a rotary body which is of a structural configuration providing structurally predetermined compensation planes and restricted angular regions thereof, for compensation of such unbalance, the circuit arrangement comprising: input means for receiving electrical signals characterizing unbalance detected on the rotary body; conversion means for converting said input signals to the structurally predetermined compensation planes; and means for determining the polarity of the signals, the arrangement being such that, when the signal polarity indicates that the unbalance cannot be compensated in a said compensation plane, said signals are converted to another compensation plane or planes and/or to a substitution plane or planes in which said unbalance can be compensated, by a circuit means connected to the output of said polarity-determining means and comprising at least:

a. a first inverting amplifier for receiving from the polarity-determining means signals which characterize unbalance that cannot be compensated in a said compensation plane;

b. a second inverting amplifier for receiving from the polarity-determining means signals which characterize unbalance that cannot be compensated in a second said compensation plane;

c. a third inverting amplifier operatively connected to the output of said first inverting amplifier;

d. means for influencing the output of said third inverting amplifier in dependence on the distance of the substitution plane from a said compensation plane; and e. means connecting the output of said first inverting amplifier to the input of said second inverting amplifier;

whereby, in operation, the output of the first inverting amplifier is added by way of the third inverting amplifier to the output of the second inverting amplifier and the output of the first inverting amplifier is applied to the input to the second inverting amplifier, such that the output of the second inverting amplifier is available for use in unbalance compensation in said substitution plane and the result of the operation of adding the outputs of the first and second amplifiers is available for use in unbalance compensation in said other compensation plane.

In a preferred embodiment, the arrangement has voltage divider means, preferably in the form of potentiometers, for the purposes of influencing the outputs of the inverting amplifiers in dependence on the distance of a middle substitution plane from one of the compensating planes.

An embodiment of an arrangement according to the present invention will now be described by way of example with reference to the accompanying drawings in which.

Figure 1:
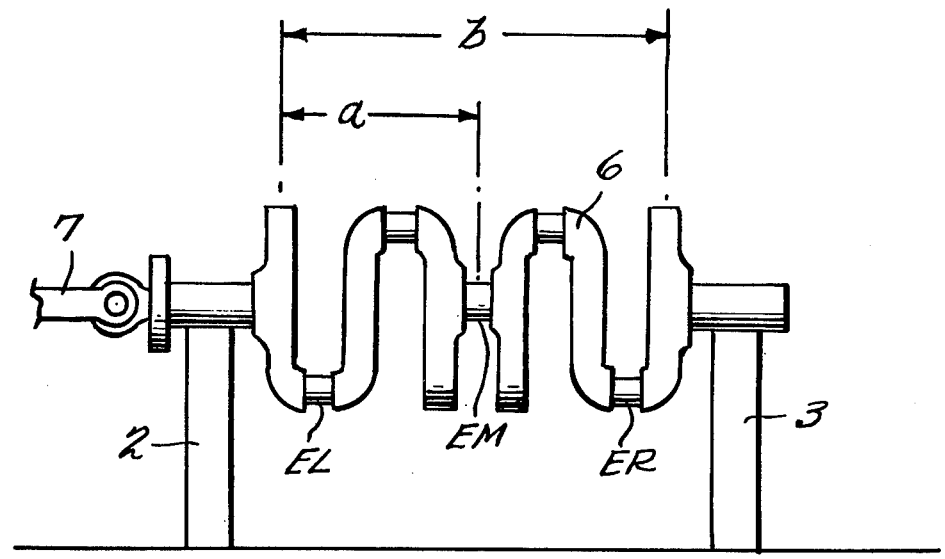
FIG. 1 is a diagrammatic view of a body to be balanced, mounted in a balancing machine.

Referring to FIG. 1, disposed in a balancing machine (not shown) is a receiving means 1 for rotatably mounting a body which suffers from unbalance and which, as illustrated, is a four-cylinder engine crankshaft 6. The receiving means 1 includes two mounting stand members 2 and 3 with which conventional pick-ups 4 and 5 (FIG. 2) are associated in known manner, for detecting vibrations or oscillations caused by unbalance of the body 6 as it is rotated. The crankshaft 6 is driven in rotation by way of a cardan shaft 7. By virtue of the structural configuration of the crankshaft, unbalance correction or compensation can be carried out only over restricted angular regions and in given compensation planes of the crankshaft 6. Thus, outer compenstion planes are indicated at EL and ER, while EM denotes an additional middle plane in relation to which the unbalance can be corrected on the two inner crank webs, in equal amounts on each. A middle plane as at EM is found to be advantageous from the balancing process point of view, as is known, particularly when balancing a four-cylinder crankshaft. There may be more than one plane such as at EM, depending on the form of the body to be balanced and such plane or planes are referred to herein as substitution planes, in that they provide substitutes for the compensation planes in which unbalance compensation cannot be carried out.

Figure 2:
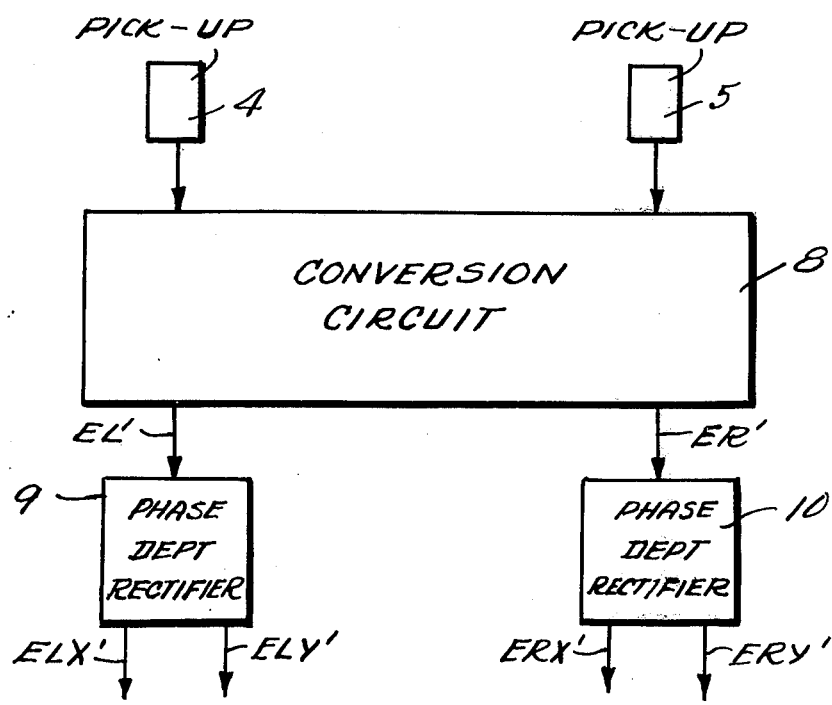
FIG. 2 is a diagrammatic view of part of the arrangement, for processing of measurement values.

The measurement values produced by the pick-ups 4 and 5 are passed to an electrical frame or conversion means 8 which is diagrammatically shown in FIG. 2 and which converts the measurement values from the planes at the pick-ups 4 and 5 to the outer compensation planes EL and ER, which are at a spacing $b$ from each other. The output values representing the unbalance in planes EL and ER are denoted at EL' and ER' in FIG. 2 and are applied to phase-dependent rectifiers 9 and 10 which are connected to the output of the means 8. The values EL' and ER' in respect of the compensation planes are divided into $x$ and $y$ components which are adapted to the configuration of the crankshaft, this being done separately for each plane EL and ER. These components are $ELx'$ and $ELy'$ for the left-hand compensation plane EL, and $ERx'$ and $ERy'$ for the right-hand compensation plane ER.

Figure 3:
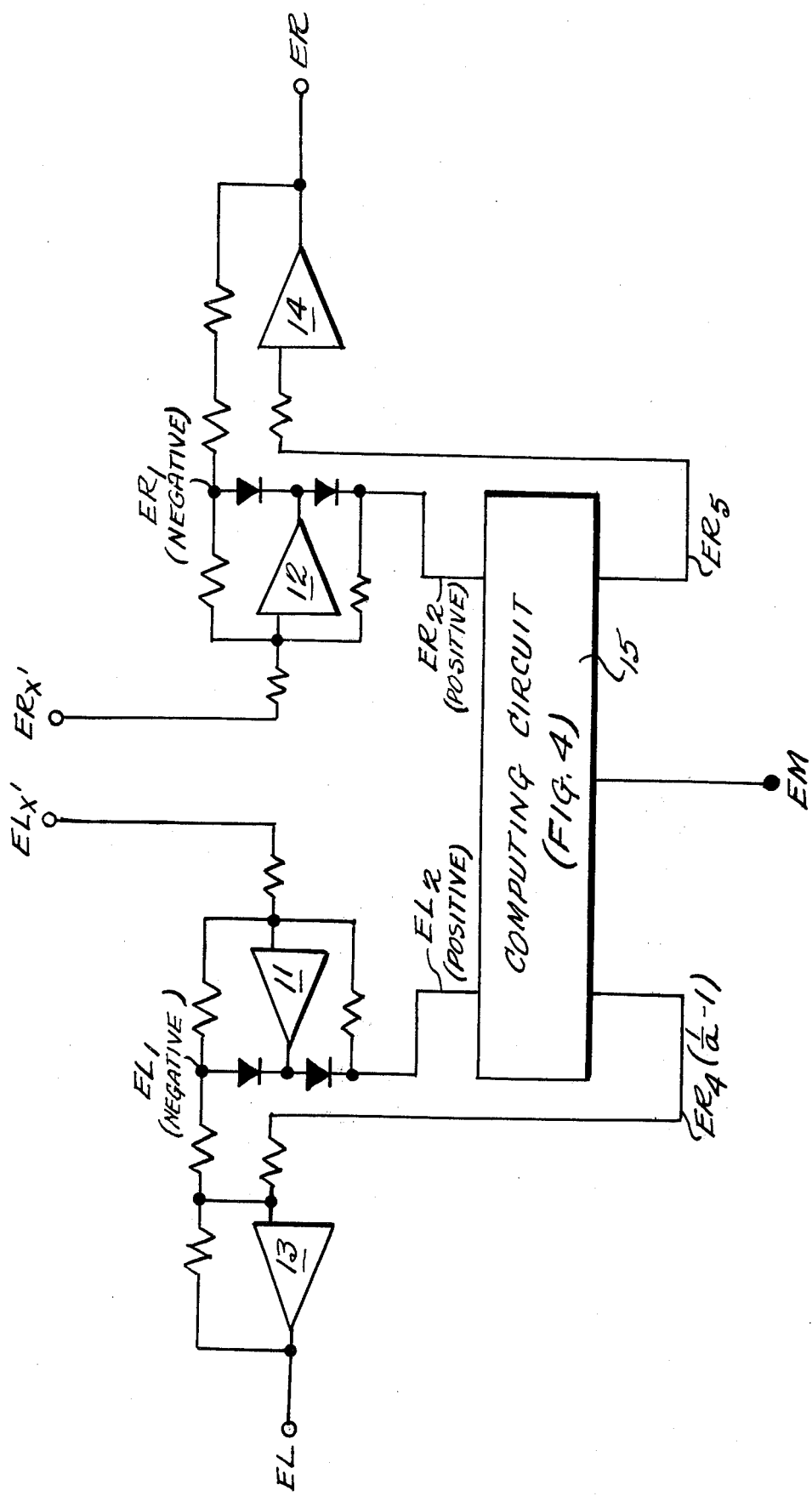
FIGS. 3 and 4 show circuit assemblies for further processing the measurement values.

FIG. 3 shows by way of example further processing of the components $ELx'$ and $ERx'$ delivered by the rectifiers 9 and 10. The circuit arrangement for the other components (that is to say, for the y-components of the two compensation planes EL and ER) is constructed in a similar manner.

As shown in FIG. 3, the polarity of the measurement voltages representing the components $ELx'$ and $ERx'$ for the right-hand and left-hand compensation planes of FIG. 1 is established by suitable means such as amplifiers 11 and 12, preferably by way of diodes. When the output values $EL_1$ and $ER_1$ of the amplifiers 11 and 12 are negative voltages, these are applied directly to amplifiers 13 and 14, respectively. This means that when the output values of the amplifiers 11 and 12 are of negative polarity, unbalance compensation is possible in the outer compensation planes EL and ER, as denoted by the outputs EL and ER in FIG. 3, these output values being used to control the machine for removing the unbalance.

If however, the output values of the amplifiers 11 and 12 are of positive polarity, this means that compensation in the above-mentioned planes EL and ER cannot be effected, due to the structural configuration of the crankshaft and the nature of the unbalance to be corrected. Accordingly, these positive values are then passed to a computing unit 15 which carries out the conversion to the respective substitution plane or planes, as at EM in FIG. 1, in which unbalance compensation is possible. It will be appreciated that while FIG. 1 shows only one substitution plane at EM, in effect this represents two substitution planes, as material is added to or removed from the inner crank webs to compensate for the unbalance.

Figure 4:
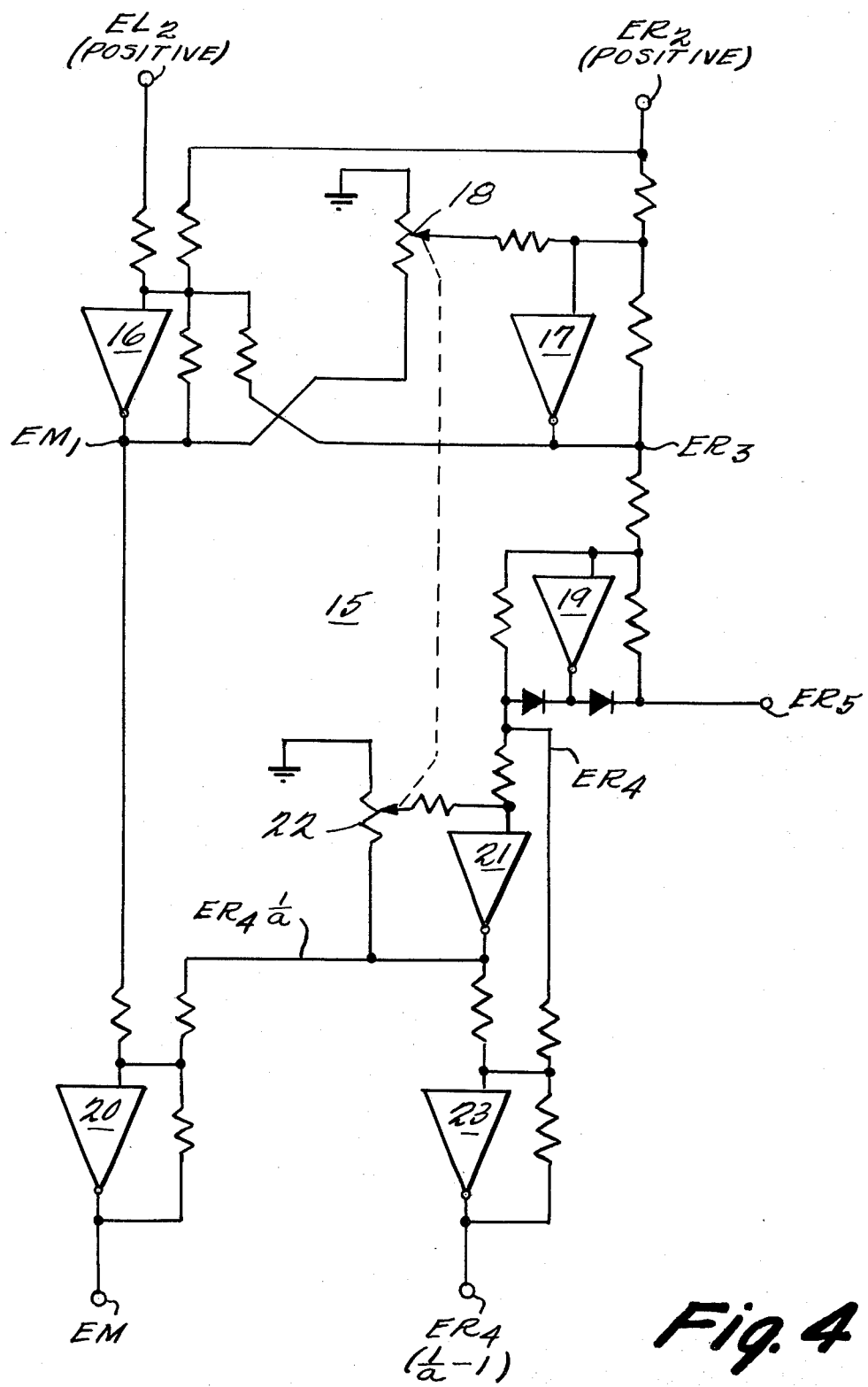

FIG. 4 shows the computing unit 15 in greater detail.

The positive voltages $EL_2$ and $ER_2$, denoting unbalance components in the compensation planes EL and ER, which as described above cannot be compensated in said compensation planes, are fed into the unit 15. The unit 15 carries out conversion to the respective substitution planes as at EM and the circuit elements are connected, in accordance with the following equations (the significance of the symbols used will become apparent below)

$$EL_2 + ER_2 + EM_1 + ER_3 = 0$$

$$EM_1 \cdot a + ER_3 \cdot b + ER_2 \cdot b = 0$$

The unit 15 has inverting amplifiers 16 and 17 for the conversion operation, while there is a potentiometer 18 for setting the unit 15 in accordance with the distance $a$ in FIG. 1, i.e., the distance of plane EM from each plane EL and ER. $ER_2$ and $EL_2$ are connected to the input to amplifier 16. The outputs of the two amplifiers 16 and 17 are varied by the adjustment at the potentiometer 18. After the conversion operation, a voltage value $EM_1$ appears at the output of the amplifier 16 and a voltage value $ER_3$ appears at the output of the amplifier 17. The value $EM_1$ can be used directly for unbalance compensation in the substitution plane (or planes) EM and is applied by way of an amplifier 20 to an appropriate output.

If the output voltage $ER_3$ is negative, that is to say, it represents a parameter which indicates that the unbalance component in question can be compensated in the plane ER, the voltage $ER_3$ is applied to an inverting amplifier 19 for adding it directly, in the form of voltage value $ER_5$, to the value $ER_1$ at the amplifier 14 (FIG. 3). In this case, both for the substitution plane as at EM and for the compensation plane ER, this results in corresponding electrical parameters with which in the present example the x-components of the unbalance can be compensated or corrected.

If the voltage value $ER_3$ is of a positive polarity, that is to say, it represents an electrical parameter which indicates that the unbalance component in question cannot be corrected in the compensation plane ER, the following computing operations are carried out in the computing unit 15, in conjunction with the amplifiers 13 and 14:

$$EM = EM_1 + ER_4 \cdot 1/a$$

$$EL = EL_1 + ER_4 \cdot [(1/a) - 1]$$

$$ER = ER_1 + ER_5$$

The above specified relationships thus represent the voltage values for the two outer planes EL and ER and for the middle plane EM, and the subsequent unbalance compensation operation occurs, in this case, at most in two of those planes.

The positive voltage value $ER_3$ is applied by way of the amplifier 19, to an inverting amplifier 21 for determining value $ER_4 \cdot 1/a$, by means of a voltage divider 22 at which the value $a$ can be set.

This converted value $ER_4 \cdot 1/a$ is added by means of an inverting amplifier 20 to the value $EM_1$ for the substitution middle plane or planes as at EM and is displayed as the final output value for the middle plane EM. In addition, the value $ER_4 \cdot 1/a$ which appears at the output of the amplifier 21 is added by way of an inverting amplifier 23 to the value $EL_1$ for the left-hand outer compensation El. A voltage value $ER_4 (1/a) - 1]$ then appears at the output of the amplifier 23. This value is applied to the amplifier 13 as shown in FIG. 3 in conjunction with the value $EL_1$ and used for the unbalance display and an unbalance compensation operation in the operation in the left-hand outer compensation plane EL.

In this way, the corresponding values for compensation of the x-component of the unbalance can be obtained for the two outer compensation planes EL and ER and for the two substitution middle planes.

An identical form of the circuit arrangements of FIGS. 3 and 4 is used in respect of the y-components. The unbalance compensation operation can subsequently be carried out manually or automatically for example, by removing material from the crankshaft at the appropriate location or locations.

The above-described circuit arrangement makes it possible for the machine in which it is fitted to be used in balancing widely varying configurations of bodies which can be balanced only in predetermined planes and limited angular regions, insofar as the electrical measurement values or electrical voltages which are proportional to the mechanical oscillations detected at the mounting stands can be converted to appropriate planes in which unbalance compensation can be carried out. For example, when such measurement values or electrical voltages in a given compensation plane such as ER or EL have a negative sign, they are converted to any other compensation plane or one or more substitution planes. Such variations can be taken into account, for example, as described above by means of a calibrated potentiometer, to effect plane displacement so that different crankshaft constructions or rotary body structures in which the substitution plane or planes are at different distances relative to the compensating planes can be processed.

Many changes and modifications of the above described embodiment of the invention can, of course, be carried out without departing from the scope thereof. Accordingly, that scope is intended to be limited only by the appended claims.

What is claimed:

1. A method of determining unbalance of a rotary body which is of a structural configuration providing structurally predetermined compensation planes and restricted angular regions thereof, for compensation of such unbalance, comprising:

determining the magnitude and angular position of an unbalance;

determining whether said unbalance can be compensated in at least one said compensation plane; and, if said compensation cannot be so connected, converting the unbalance value to another compensation plane and/or to a substitution plane in which such compensation can be so effected by the following steps: applying a first electrical signal representing a said unbalance value that cannot be compensated in a said compensation plane, to a first inverting amplifier; applying a second electrical signal representing an unbalance value that cannot be compensated in another said compensating plane, to a second inverting amplifier; adding the output of the first inverting amplifier to the output of the second inverting amplifier, by way of a third inverting amplifier whose output value varies as a function of the distance of said substitution plane from a said compensation plane, the output of the first inverting amplifier also being applied to the input of the second inverting amplifier, the output of the second inverting amplifier being available for use for unbalance compensation in said substitution plane and the result of the adding operation being available for use in unbalance compensation in said other compensation plane.

2. A method according to claim 1 wherein the output of said first inverting amplifier is also added by way of a fourth inverting amplifier to said second electrical signal.

3. For a balancing machine, a circuit for determining unbalance of a rotary body which is of a structural configuration providing structurally predetermined compensation planes and restricted angular regions thereof, for compensation of such unbalance, the circuit comprising:

input means for receiving electrical signals characterizing unbalance detected on the rotary body and converting said input signals to the structurally predetermined compensation planes; and means for determining the polarity of said input signals so that, when the signal polarity indicates that the unbalance cannot be compensated in a said compensation plane, said signals are converted to another compensation plane or planes and/or to a substitution plane or planes in which said unbalance can be compensated, by a circuit means connected to the output of said polarity-determining means and comprising:

a. a first inverting amplifier for receiving from the polarity-determining means signals which characterize unbalance that cannot be compensated in a said compensation plane;

b. a second inverting amplifier for receiving from the polarity-determining means signals which characterize unbalance that cannot be compensated in a second said compensation plane;
c. a third inverting amplifier operatively connected to the output of said first inverting amplifier;
d. means for varying the output of said third inverting amplifier as a function of the distance of the substitution plane from a said compensation plane; and
e. means connecting the output of said first inverting amplifier to the input of said second inverting amplifier;

whereby, in operation, the output of the first inverting amplifier is added by way of the third inverting amplifier to the output of the second inverting amplifier and the output of the first inverting amplifier is applied to the input to the second inverting amplifier, such that the output of the second inverting amplifier is available for use in unbalance compensation in said substitution plane and the result of the operation of adding the outputs of the first and second amplifiers is available for use in unbalance compensation in said other compensation plane.

4. A circuit according to claim 3 and further including a fourth inverting amplifier operatively connected to the output of the third inverting amplifier, further input signals characterizing unbalance in said second compensation plane also being applied to said fourth inverting amplifier, thereby to add the output of said first inverting amplifier and said further input signals.

5. A circuit according to claim 3 wherein said influencing means comprises a voltage divider.

6. A circuit according to claim 3 including respective voltage dividers for influencing the outputs of the first and second inverting amplifiers in dependence on said distance.

7. A circuit according to claim 6 wherein each said voltage divider is a potentiometer.

* * * * *